July 6, 1971          F. E. ULLMAN          3,591,351
RETICULATED STRUCTURE AND METHOD OF MANUFACTURE
Filed Nov. 30, 1967          5 Sheets-Sheet 1
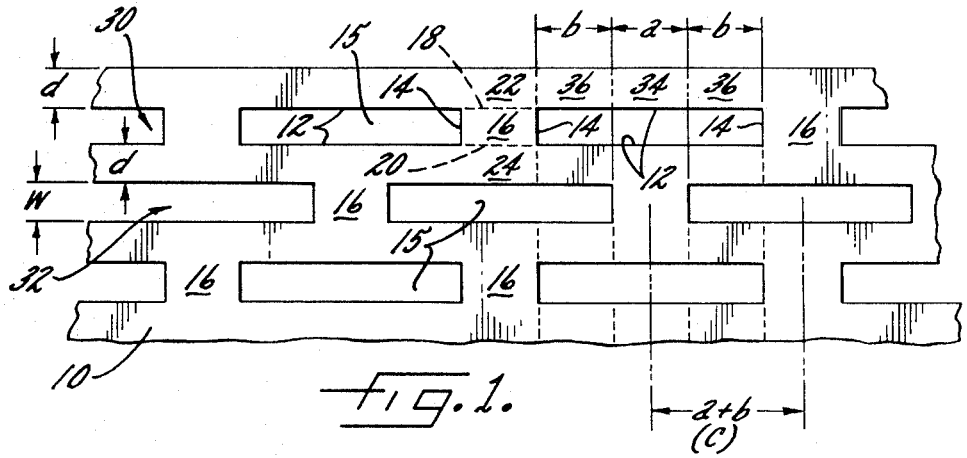
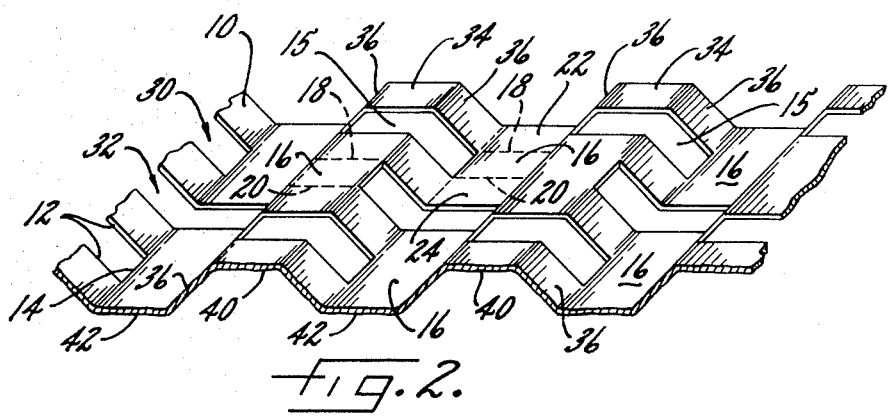
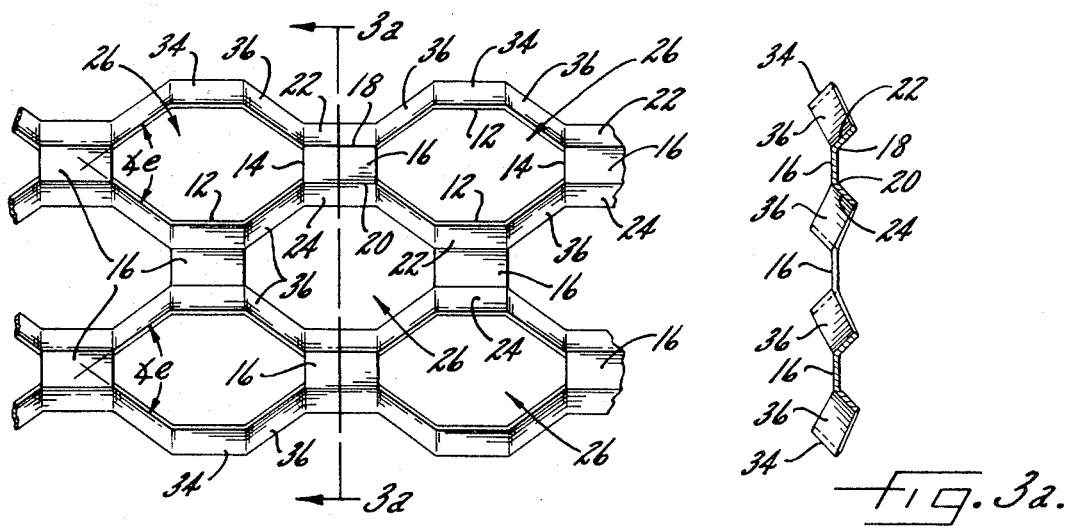
INVENTOR.
FREDERICK E. ULLMAN,
BY Wolfe, Hubbard, Voit & Osann
ATTORNEYS.

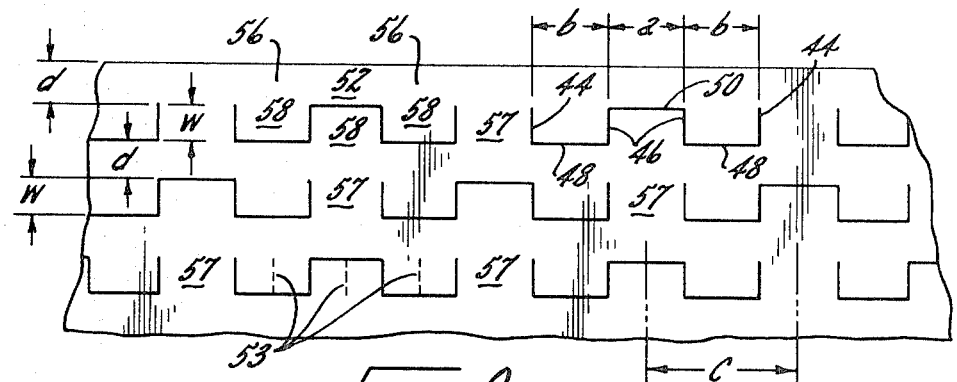
Fig. 9.
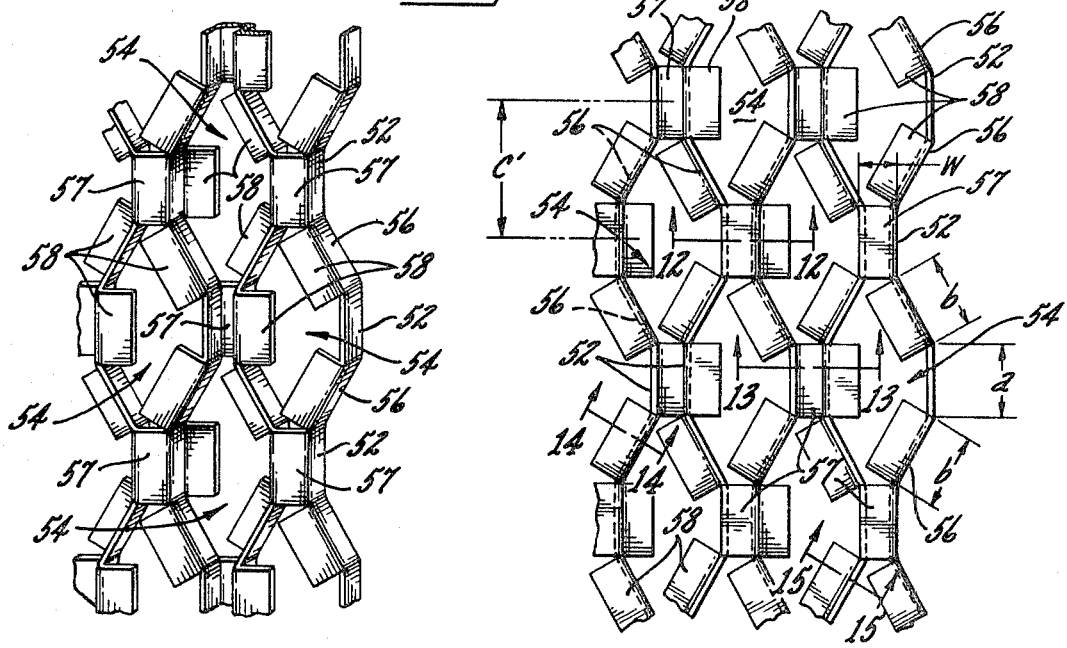
Fig. 10.  Fig. 11.
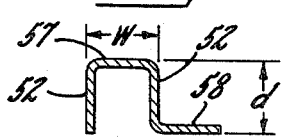 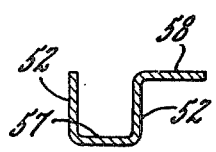 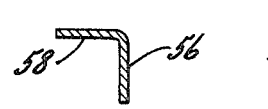 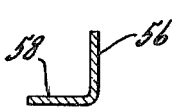
Fig. 12.  Fig. 13.  Fig. 14.  Fig. 15.
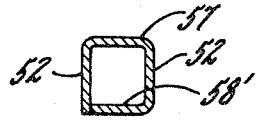 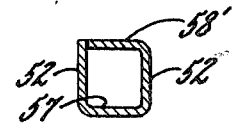  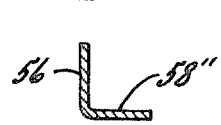
Fig. 16.  Fig. 17.  Fig. 18.  Fig. 19.
INVENTOR.
FREDERICK E. ULLMAN,
BY
Wolfe, Hubbard, Voit & Osann
ATTORNEYS.

INVENTOR.
FREDERICK E. ULLMAN,
BY Wolfe, Hubbard, Voit & Osann
ATTORNEYS.

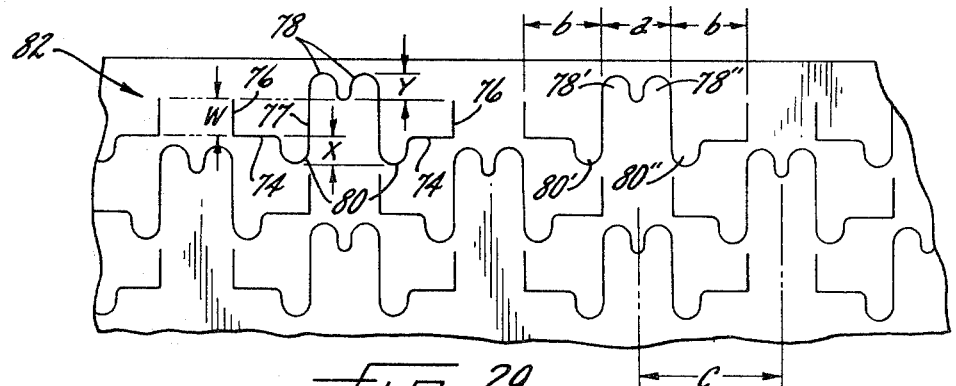
Fig. 29.
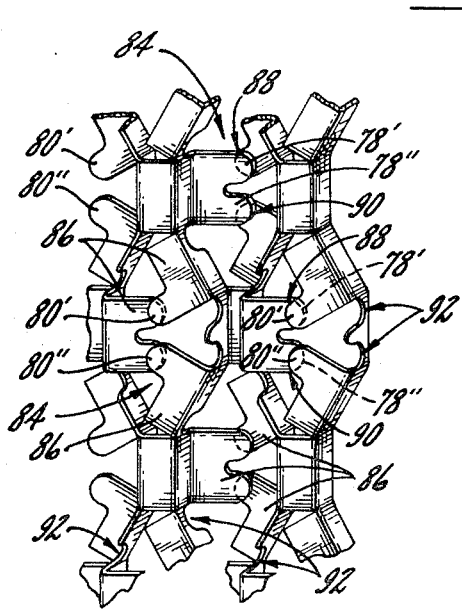
Fig. 30.
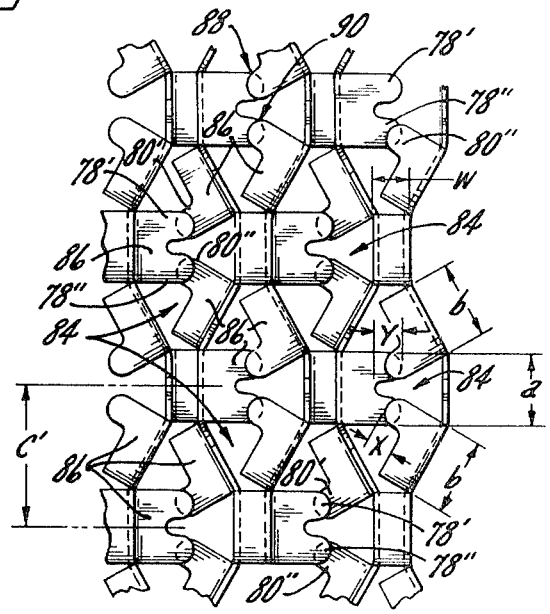
Fig. 31.
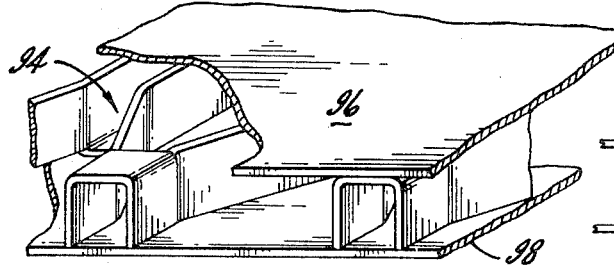
Fig. 32.
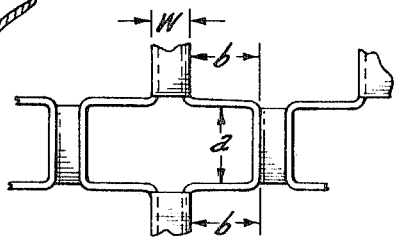
Fig. 34.
Fig. 33.
INVENTOR.
FREDERICK E. ULLMAN,
BY Wolfe, Hubbard, Voit & Osann
ATTORNEYS.

United States Patent Office 3,591,351
Patented July 6, 1971

3,591,351
RETICULATED STRUCTURE AND METHOD OF MANUFACTURE
Frederick E. Ullman, Winnetka, Ill., assignor to Inland Steel Company, Chicago, Ill.
Filed Nov. 30, 1967, Ser. No. 687,031
Int. Cl. E04b *1/18;* B21d *13/10, 31/04*
U.S. Cl. 29—193.5        33 Claims

ABSTRACT OF THE DISCLOSURE

A reticulated structure made from sheet material, methods of manufacture thereof, and precut sheet material useful in forming the same, the structure being characterized by a plurality of side portions and bridge portions forming rows of spaced, interrupted polygonal-shaped apertures, the bridge portions being substantially parallel to and in the plane of the top and bottom surfaces defined by the reticulated structure side portions and connecting adjacent sides forming the apertures and/or flaps appended to some of the sides of the apertures providing increased surface areas in the planes defined by the outer surfaces of the reticulated structure.

CROSS REFERENCES TO RELATED APPLICATIONS

Frederick E. Ullman, Ser. No. 678,912 filed Oct. 30, 1967.

BACKGROUND OF THE INVENTION

This invention relates to reticulated structures, to methods for fabricating such structures and to precut sheet material useful in forming the same and, more particularly, to a reticulated structure that is characterized by its ability to provide an increased surface area in the planes defined by the outer surfaces of the structure parallel to the plane of the structure so as to facilitate the bonding of a skin to the structure and, in some instances, so as to form an integral single-piece, panel-like structure which, although no separate skin is bonded thereto, nevertheless possesses similar characteristics to panels having such a skin.

In my aforesaid co-pending patent application relating to reticulated structures, there is disclosed an integral reticulated structure and methods of manufacturing the same, wherein the structure has a maximum resistance to bending stresses in a direction substantially perpendicular to the plane of the structure. Prior to my invention as disclosed in the aforesaid copending application, there was no known commercially feasible method available which could be employed to fabricate an integral reticulated structure from intermittently slitted sheet materials such as steel to form a structure having the material thereof substantially vertical to the planes defined by the top and bottom surfaces of the structure. A structure of this type fabricated from structural materials such as steel can be advantageously used in a variety of applications, particularly where a relatively high strength-to-weight ratio is required. For example, when a load is exerted on the top surface of such a structure, that surface is placed in compression and the bottom surface in tension. The reticulated structures of my invention resist the resulting bending stresses both longitudinally and transversely of the structure.

Many applications in which a structure of the above-identified type could be utilized require that the reticulated structure serve as a core material. A skin or layer of a plastic, metal or other material is then bonded or attached to the top surface or bottom surface (or both) of the reticulated structure to provide a structural panel. The skin or layer can be bonded by any typical fastening means such as welding, riveting or gluing.

To increase the strength of the bond between the skin or layer and the core structure, the reticulated structure may be provided with an increased surface area in the planes defined by the outer surfaces of the structure and parallel to the plane of the structure. The present invention contemplates precutting sheet material to form a perforated or slitted sheet which permits the production of an integral reticulated structure from sheet materials such as steel, paper and the like to form a structure having a relatively high strength-to-weight ratio, yet which provides an increased surface area to facilitate the bonding of a skin or layer, and in some instances, to form an integral one-piece panel having not only a reticulated core, but also, at least one foraminous skin.

It is a general aim of the present invention to provide an improved integral reticulated structure, methods of manufacture thereof and precut sheet material useful in forming the same which permit of ease of manufacture wherein the resultant product is characterized by having an increased surface area in or parallel to the planes defined by the top and bottom surfaces of the structure to facilitate bonding of a skin or layer of material to the surfaces.

A related object is the provision of an integral reticulated structure of the foregoing type that can be economically fabricated.

Another aspect of this invention includes providing a reticulated structure in which the pressure which is sometimes applied to aid in bonding the skin or layer to the core-defining structure causes the core to form into the desired ultimate shape.

A further object of this invention provides a reticulated structure wherein the rigid structural member formed by bonding a skin or layer to such a reticulated structure is characterized by improved rigidity and strength in directions substantially parallel to the plane of the structure.

A still further aspect is the inclusion of a rigid structural panel-like member that can be fabricated from a sheet material without the necessity of bonding a skin or layer of material to either or both of the top and bottom surfaces of the structure, yet which possesses characteristics typical of those panels which do require one or more skins.

Other objects and advantages of the invention will become apparent as the following description proceeds, taken in conjunction with the accompanying drawings, all of which are fragmentary, in which:

FIG. 1 is a plan view showing a sheet of material that has been precut to form offset longitudinal rows of spaced perforations in accordance with a selected repetitive pattern and which can be used to fabricate a novel reticulated structure in accordance with one form of this invention;

FIG. 2 is a perspective view of the sheet of material shown in FIG. 1, here depicting the sheet after an initial forming operation in accordance with one novel method of this invention, and preparatory to folding the sheet material to form one embodiment of the reticulated structure;

FIG. 3 is a top plan view in which the precut formed sheet of material shown in FIGS. 1 and 2 has been partially folded in accordance with the method of the present invention;

FIG. 3a is a front elevation of the partially folded sheet material shown in FIG. 3;

Figure 4:
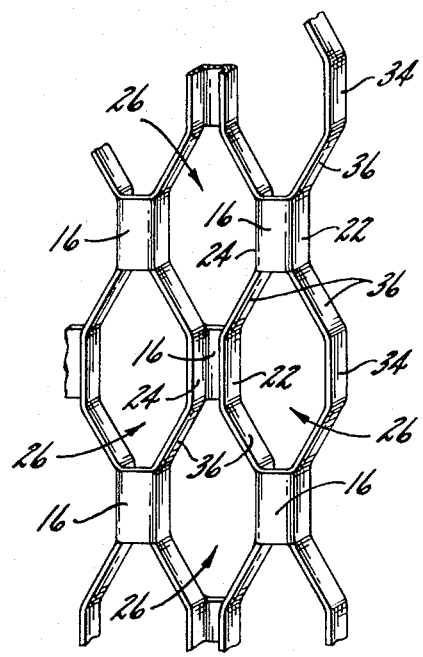
FIG. 4 is a perspective view of one exemplary reticulated structure embodiment which has been here made using the repetitive perforation pattern of FIG. 1.
Figure 20:
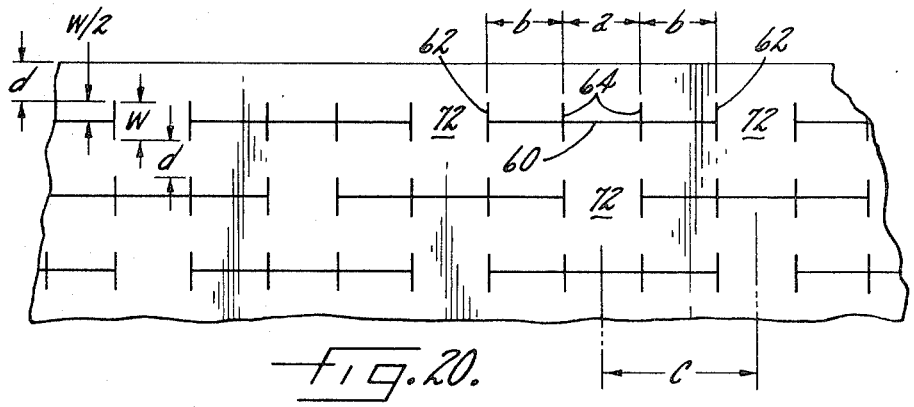
Figure 21:
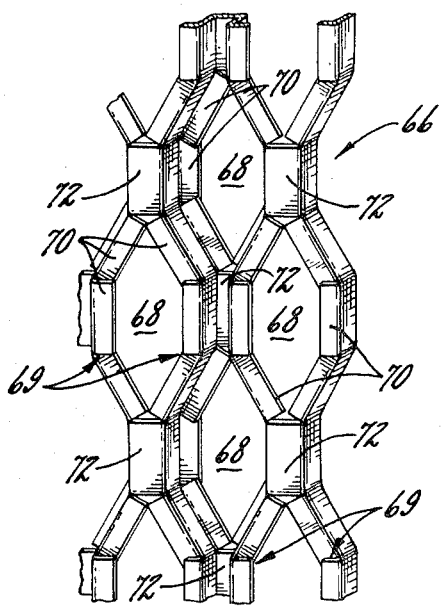
Figure 22:
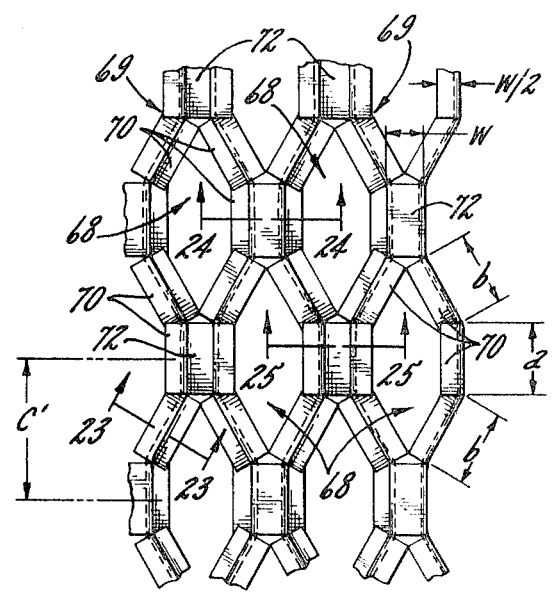
Figure 23:
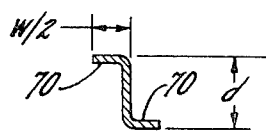
Figure 24:
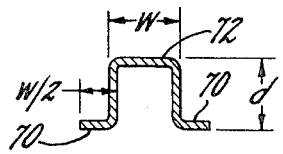
Figure 25:
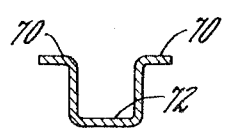
Figure 26:
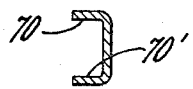
Figure 27:
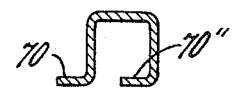
Figure 28:
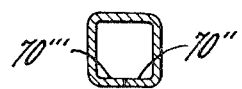

FIG. 9 is a plan view showing a sheet of material that has been formed with offset longitudinal rows of spaced, interrupted slits in accordance with a somewhat different repetitive pattern than shown in FIG. 1 so as to form an alternative embodiment wherein the material defining the sides of each aperture (except for the outermost straight side of the apertures in the outermost row) contain material for a flap adjacent either the top or bottom surface of the structure;

FIG. 10 is a perspective view of the reticulated structure formed from a sheet employing the slitting pattern illustrated in FIG. 9;

FIG. 11 is a top plan view of the embodiment illustrated in FIG. 10;

FIGS. 12 through 15 are cross-sectional views taken substantially along the lines 12—12, 13—13, 14—14 and 15—15, respectively, of FIG. 11 depicting the positioning of the flaps that are formed in the structure illustrated in FIG. 10;

FIGS. 16 through 19 are cross-sectional views similar to FIGS. 12 through 15, respectively, but here illustrating alternative positioning of the flaps;

FIG. 20 is a plan view showing a sheet of material that has been formed with offset longitudinal rows of spaced, interrupted slits in accordance with yet another repetitive pattern to form an embodiment wherein the material defining the sides of each aperture contains material for flaps adjacent both the top and bottom surfaces of the structure, except for the outermost sides of the outermost row of apertures wherein the flaps are adjacent either the top or bottom surface of the structure;

FIG. 21 is a perspective view of the reticulated structure made from the slitting pattern illustrated in FIG. 20;

FIG. 22 is a top plan view of the embodiment illustrated in FIG. 21;

FIGS. 23 through 25 are cross-sectional views taken substantially along the lines 23—23, 24—24 and 25—25, respectively, of FIG. 22, here illustrating in still greater detail the positioning of the flap portions;

FIGS. 26 through 28 are cross-sectional views similar to FIGS. 23 through 25, respectively, but illustrating alternative positioning of the flap portions;

FIG. 29 is a plan view of a sheet of material that has been formed with offset longitudinal rows of spaced, interrupted slits in accordance with still another repetitive slitting pattern;

FIG. 30 is a perspective view of a reticulated structure that has been formed by using the slitting pattern illustrated in FIG. 29 and wherein the flaps overlap and may be secured together to provide a rigid reticulated structural panel-like member;

FIG. 31 is a top plan view of the reticulated structure shown in FIG. 30 showing the positioning of the various overlapping flap portions;

FIG. 32 is a perspective view of the reticulated structure shown in FIG. 4 and in which a skin has been bonded to the top and bottom surfaces of the structure;

FIG. 33 is a top plan view of a sheet of material that has been precut with a modified repetitive pattern of spaced, interrupted slits that is somewhat similar to the pattern depicted in FIG. 9; and, FIG. 34 is a top plan view of a portion of another embodiment of the reticulated structure of this invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. For example, the particular order in which the steps comprising the novel method are carried out is not critical and can be varied if desired. Moreover, it may be desirable to slit and form the sheet material simultaneously.

In accordance with the present invention, an integral reticulated structure characterized by having increased surface areas in, or generally parallel to, the planes defined by the top and bottom surfaces of the structure is made by initially precutting sheet material (e.g. slitting, punching, cutting, or in any other suitable manner) to form offset longitudinal rows of a repetitive pattern of spaced, interrupted slits including both longitudinal slits and transverse slits wherein, in the form of the invention shown in FIG. 1, the latter intersect the former at the ends thereof. As here shown, the sheet of material 10 has longitudinal slits 12 that are intersected by transverse slits 14. Thus, each of the slit patterns in FIG. 1 defines a perforation 15 wherein the longitudinal dimension is bounded by the slits 14 and the lateral dimension is similarly bounded by the slits 12. The slit sheet material, with the material within the perforations 15 having been removed (FIG. 2), is then formed to provide a longitudinal series of alternating elevations and depressions which have flat crests and bottoms and which extend across the lateral dimension of the sheet material. These elevations and depressions are formed so that at least part of the unslit or imperforate portions of the sheet bridging the successive patterns alternately coincide with the crests and bottoms. The completed structure is then obtained, as best shown in FIGS. 1 through 4, by folding the unslit or imperforate portions adjacent bridge portions 16 along the dotted lines 18 and 20 to bring the portions between the fold lines and the laterally adjacent longitudinal slits, i.e. the portions 22 and 24, into a position substantially perpendicular to the planes defined by the top and bottom surfaces of the structure.

As illustrated in FIG. 4, there is provided a stable integral reticulated structure which comprises rows of spaced, interrupted polygonal-shaped apertures 26 and bridge portions 16 that are parallel to the surfaces defined by the top and bottom of the reticulated structures. These bridge portions 16 serve to connect the adjacent apertures 26. The longitudinal rows of bridge portions are alternately adjacent the bottom of the structure and the top of the structure. Each of the sides defining an aperture 26 is substantially perpendicular to the surfaces defined by the top and bottom surfaces of the structure.

Figure 5:
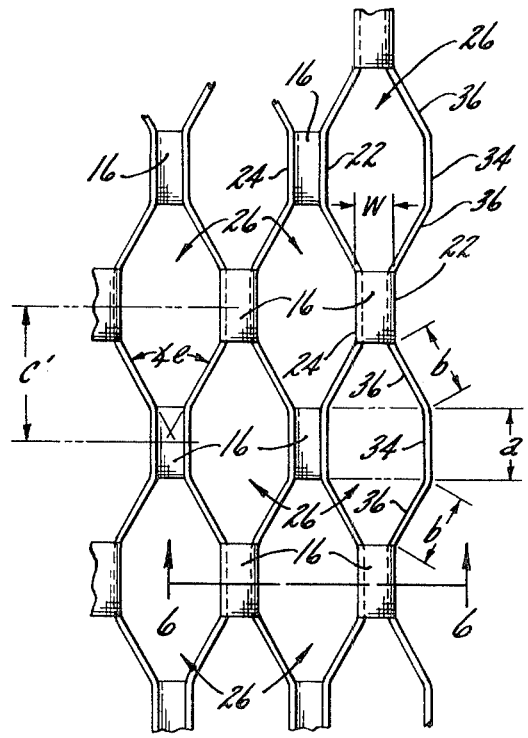
FIG. 5 is a top plan view of the embodiment of the invention illustrated in FIG. 4.
Figure 6:
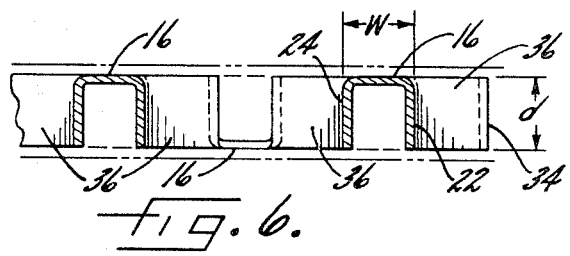
FIG. 6 is a sectional view taken substantially along the lines 6—6 of FIG. 5, here illustrating particularly the relationship between the sides of the apertures and the bridge portions connecting adjacent apertures.

Turning now to a more detailed description of the improved construction, FIGS. 1 through 6 illustrate a method for fabricating one exemplary structure in accordance with the present invention as well as the resulting reticulated structure. The sheet material 10 in FIG. 1 is, in the exemplary embodiment, first precut by slitting, punching, or the like in a predetermined repetitive pattern to form offset rows of spaced, interrupted perforations 15. Thus, the first row of the repetitive pattern 30 comprises the perforations 15 defined by spatially disposed longitudinal slits 12 that are intersected at their ends by transverse slits 14. The second row of the pattern 32 is identical to the first but is offset. To form a reticulated structure having apertures of an octagonal shape with straight sides 34 of a length $a$, angled sides 36 of length $b$ and bridge portions 16 with a length $a$, a width $w$ and a depth $d$ for the structure, the length of the longitudinal slits 12 (FIG. 1) should be $a+2b$ and the transverse slits 14 should be $w$ in length. The lateral distance between the repetitive patterns should be $d$. The length $a$ of the straight sides 34 also dictates the longitudinal distance between adjacent transverse slits 14 and, thus, the length of the bridge portions 16. The distance, $c$, between the midpoint of the longitudinal dimension of the perforation 15 or the slit 12 and the longitudinally adjacent perforations or slit 12 in an adjacent row is equal to the sum of $a+b$. The forming step decreases this distance to a new distance, $c'$, that is determined by the following formula: $c'=a+b \cos \frac{1}{2}e$ wherein $a$ is the length of the straight sides or faces of the aperture, $b$ is the length of the angled sides or faces and $e$ is the angle in degrees that would be formed if the angled sides intersected. While the dimensions illustrated in FIG. 5 are approximately identical to the corresponding dimensions identified in the slit sheet material shown in FIG. 1, it should be appreciated that there may be some slight variation due to material lost in cutting or dimensional changes resulting from the folding operation.

In carrying out one process for forming reticulated structures according to the present invention, the perforated sheet material 10 is then subjected to a forming operation to create a longitudinal series of depressions and elevations extending across the lateral dimension of the sheet material. This forming step determines the shape of the apertures in the reticulated structure through the particular shape of these elevations and depressions. To this end, the exemplary embodiment shown in FIG. 2 is formed with a series of elevations 40 each illustrated as one half of a downwardly extending hexagon including the angled sides 36. The straight side 34 is located at the crest of the elevations and is parallel to the plane of the perforate sheet material. A depression 42 is thus located between each adjacent pair of elevations 40, which depression is also defined by the angled sides 36 which form the longitudinally adjacent elevations, and by an intermediate straight side 34. The straight side 34 is at the bottom of the depression 42 and is also parallel to the plane of the slit sheet material. In the illustrative embodiment the straight sides 34 at the crest and at the bottoms are equal in length to the distance $a$ between adjacent perforations 15. Also, the relation of the elevations and depressions to the perforations is such that the bridge portions 16 (e.g. the areas within the dotted lines in FIG. 1) coincide with both the crest of the elevations 40 and with the bottoms of the depressions 42.

According to the illustrative method, the final step in making the reticulated structure comprises folding the areas 22 and 24 along lines 18 and 20 that are located at the ends of the transverse slits 14 and parallel to the longitudinal slits to bring these portions into a position substantially perpendicular to the planes defined by the top and bottom surfaces of the reticulated structure. Thus, as is shown in FIGS. 1 through 4, the areas 22 and 24 coinciding with the crests of the elevations are folded upwardly. Similarly, the areas 22 and 24, which coincide with the bottom of the depressions 42, are folded downwardly. As illustrated in FIGS. 3 and 3a, the respective areas 22 and 24 have been partially folded downwardly and upwardly with the octagonal shape now becoming apparent. Completion of the folding, as can be seen in FIG. 4, brings the areas 22 and 24 into position substantially perpendicular to the top and bottom surfaces of the resulting reticulated structure.

Figure 7:
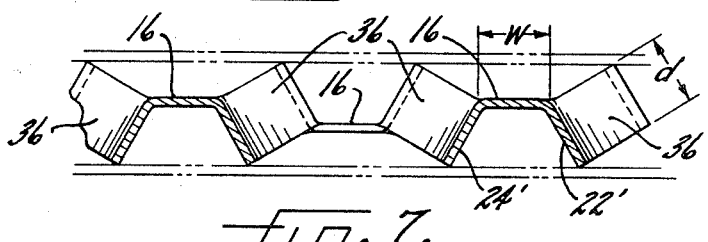
FIG. 7 is a section similar to FIG. 6, but here depicting a core which may be used without a skin or layer for some purposes such as reinforcing and may also be used as an intermediate forming stage that is particularly suitable for use when pressure is required to bond a skin or layer to the edges of the reticulated structure.
Figure 8:
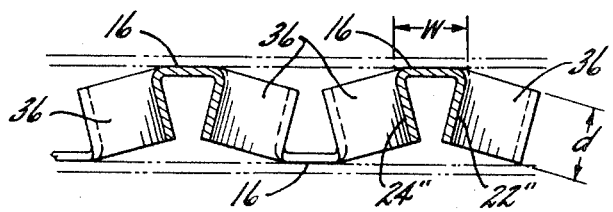
FIG. 8 is a sectional view similar to FIG. 7, but here illustrating a core at an intermediate forming stage which is particularly suitable for applications wherein pressure is required to bond a skin or layer to the bridge portions of the structure.

In accordance with one important aspect of this invention, the degree of the folding that has been described above may be varied to provide a reticulated structure that can be subjected to pressures that would otherwise undesirably deform the structure. More particularly, in some circumstances a skin or layer of material that is to be applied to the core defined by the reticulated structure requires that pressure be utilized to effect a satisfactory bond. By varying the degree of folding such pressure can be applied to aid in the bonding and to also complete the folding to form the desired shape of the structure. To this end, FIG. 7 illustrates an embodiment that can be utilized when a skin or layer necessitating the use of pressure to bond the skin to the edges of the sides of the apertures is to be used. Thus, the areas 22', 24' have been folded through an angle of less than 90°, which represents one intermediate point in the folding operation hereinbefore described (see FIGS. 3 and 3a). Application of pressure to the top or bottom structure can result in further folding to provide the structure depicted in FIG. 6. The degree of folding can be selected as desired. The embodiment of FIG. 7 without a skin may also be employed to withstand pressures that may develop when the end use is for reinforcement purposes or the like such as, for example, in poured concrete. In FIG. 8, the areas 22", 24" have been folded through an angle greater than 90° to provide a structure that may be used when the use of pressure is needed to bond a skin to the bridge portions of the structure.

The embodiments illustrated in FIGS. 1 through 8 generate scrap material at the rate of $(a+2b)w$ square inches per aperture. In accordance with another aspect of the present invention, this excess material can be utilized to provide still further surface area adjacent either the top or bottom surfaces of the reticulated structure to which a skin or layer can be bonded. To this end, this excess material is attached as integral flaps to one or more of the sides of each aperture. It will become apparent from the ensuing description that there are many ways that can be used to distribute this excess material and all of these are within the scope of the subject invention. The particular distribution that is utilized will depend primarily upon the application to which the product is to be put.

Some application may require that the excess material be distributed in a minimum number of areas. In accordance with one aspect of this invention, there is provided an embodiment wherein such excess material may be generally distributed along three opposing sides of each aperture so as to overlay the apertures in either the top or bottom plane of the structure. The width of each of the flaps is the same as the width of the bridge portions, and the length may be identical to the length of the side to which the flap is attached. In this instance each side (except for the outermost rows on each side) has a flap attached thereto. To this end there is provided a repetitive slitting pattern illustrated in FIG. 9 which comprises terminal transverse slits 44 and intermediate transverse slits 46. These transverse slits intersect a pair of end longitudinal slits 48 and an intermediate longitudinal slit 50, that is laterally disposed from the end slits 48 by the width $w$ of the flaps (see FIG. 9). The longitudinal dimension between the terminal transverse slits 44 of each pattern should again be $a+2b$ as in the basic embodiment. Referring to FIGS. 10 through 15, the distance $a$ determines the length of the flaps attached to straight sides 52 of an aperture 54; and this also corresponds to the distance between intermediate transverse slits 46. Bridge portions 57 also have a length $a$. Similarly, the distance $b$ determines the length of the flap attached to angled sides 56 and this also corresponds to the length of the longitudinal slits 48. The width $w$ determines the width of all of the flaps as well as the length of the transverse slits. The depth $d$ of the reticulated structure is determined by the lateral distance between the intermediate longitudinal slits 50 of one row and the end longitudinal slits 48 of an adjacent row.

The forming and folding operations that has been previously discussed in connection with the basic embodiment are identical. However, the flaps or portions extending above and below the common depth of the structure are also folded to bring them into a plane corresponding to the one defined by either the top or bottom surface of the reticulated structure. The resulting structure includes rows of offset spaced apertures 54 defined by straight sides 52 and angled sides 56. Three sides of at least some of these apertures may include flaps 58, as seen in FIGS. 10 through 15, that are located either adjacent the top or the bottom of the structure.

In accordance with one modification to the embodiment shown in FIGS. 9 through 15, the flaps 58' can be folded in the opposite direction (180° from the folded position of the previously described embodiment) to provide a bridging portion that is enclosed on four sides. This modification is illustrated in FIGS. 16 and 17. Similarly, as seen in FIGS. 18 and 19, the flaps 58" that are attached to the angled sides of the apertures 54 can be folded 180° in the opposite direction from that illustrated in FIGS. 14 and 15. This modification yields a reticulated structure wherein a particular aperture 54 may contain at least one flap in both the top and bottom planes of the structure.

It should be appreciated that the flaps 58 can be fabricated with a length less than $a$ or $b$. Thus, as depicted by the dotted lines 53 in FIG. 9, some or all of the flaps 58 may be subdivided to form two or more flaps. Any number of flaps may be formed in this manner having any desired length less than the length of the side of the aperture with which they are integral.

Other applications could necessitate reticulated structures in which the excess material for bonding may be distributed about each of the sides of some or all of the apertures. FIG. 33 thus illustrates a repetitive slitting pattern wherein six flaps 55 are formed from each pattern. It should be apparent that the depicted pattern will result in a structure wherein some or all of the apertures may include flaps attached to each of the sides and located adjacent the bottom or top of the structure. Each flap 55 will have a width $w$ and a length less than the particular side to which it is attached. Patterns having more or less than the six illustrated in the FIG. 33 pattern may be used; and, if desired, the flaps may be subdivided as shown in FIG. 9.

Still further applications may require the fabrication of a reticulated structure wherein the additional surface areas for bonding are uniformly located about the apertures and have lengths identical to the side of the aperture to which they are attached. In accordance with another aspect of this invention, a reticulated structure is provided that may include flap portions distributed around all the sides of a particular aperture and may appear in the top or bottom plane of the structure. With the exception of each of the outermost rows, each side thus has two flaps attached thereto. To this end and as shown in FIGS. 20 through 28, a reticulated structure is fabricated by utilizing a repetitive slitting pattern such as is shown in FIG. 20. Each pattern includes a single longitudinal slit 60 and terminal transverse slits 62 intersecting the longitudinal slit 60 at the ends thereof. The pattern is completed by intermediate transverse slits 64. Each of the transverse slits has a length of about $w$. The length between a terminal transverse slit 62 and the adjacent intermediate transverse slit 64 should be equal to $b$, the length of the angled side of the aperture; and the dimension between the intermediate transverse slits 64 should be $a$, the length of the straight sides of the aperture.

The slit sheet material illustrated in FIG. 20 is then formed and folded as illustrated in FIGS. 2 through 3$a$. As in the previous embodiment, the flap portions extending above and below the common depth of the structure are also folded to bring them into planes substantially corresponding to the planes defined by either the top or bottom surfaces of the structure. There is thus formed, as shown in FIGS. 21 through 25, reticulated structure 66 having staggered rows of spaced, interrupted apertures 68. Each side of the aperture 68 has appended thereto a flap 70 with a length corresponding to the side to which it is integrally attached and having a width equal to about one half of a bridge portion 72 which connects longitudinally adjacent apertures.

FIGS. 26 through 28 illustrate additional alternatives that can be formed. In FIG. 26 the flaps 70' have been folded 180° from that shown in FIG. 23 to provide a reticulated structure in which some apertures have flaps in both the top and bottom planes. In the modifications illustrated, one or both of the flap portions 70" and 70''' in FIGS. 27 and 28 have been folded 180° from the direction illustrated in FIG. 24 so as to position a flap or flaps beneath the bridge portions 72.

FIG. 32 depicts a typical reticulated structure 94 (merely by way of example, a structure such as shown in FIG. 4) fabricated in accordance with this invention wherein skins 96, 98 have been bonded by any suitable means to the top and bottom surfaces, respectively, of the structure. Similarly, any of the previously described embodiments could also be provided with skins bonded to the surface or surfaces of the reticulated structure. However, it should be apparent that the flap portions do not, at least initially, have to be perpendicular with respect to the sides of the apertures. Thus, when a skin or layer requiring the application of pressure is to be bonded to the reticulated structure it may be desirable to initially bend the flap portions through angles less than 90° so that they project slightly above and/or below the top and bottom surfaces thereof (not shown). This allows the application of pressure to desirably modify the shape of the structure by further bending the flap portions so that the resulting structure with a skin or skins attached thereto includes a substantially 90° relationship between the flaps and the sidewalls.

It may be desirable for some end uses to form a rigid panel-like structural member wherein a separate skin or skins are not affixed to the surfaces of the structures. In accordance with a further aspect of this invention, there is thus provided a reticulated structure characterized by some or all of the apertures having flaps designed with overlapping portions which can be bonded together in any conventional manner such as by gluing, welding or the like. These overlapping flaps, in effect, define a partial or perforate skin; and the resulting reticulated core structure has increased rigidity in directions parallel to the planes defined by the surfaces of the structure. To this end, a repetitive slitting pattern and the reticulated structure fabricated from the slit sheet are illustrated in FIGS. 29 through 31. The repetitive pattern in FIG. 29 includes an interrupted generally longitudinal slit 74 intersected at its remote terminal ends by transverse slits 76 which have a length of $w$. Intermediate the proximate ends of the interrupted longitudinal slit 74 there is formed a curvilinear slit 77 having arcuate portions 78 and 80 that are designed to provide pairs of tabs or flaps 78', 78" and 80', 80" on opposite sides of the slit 74. Considering the first row of the slitting pattern indicated by the arrow 82, the flap portions 78' and 78" extend upwardly a distance $y$ from the end of the transverse slits 76 (as viewed in FIG. 29) while the flap portions 80', 80" extend downwardly a distance $x$ from the other end of the transverse slits 76. The flap portions 78', 78" and 80', 80" from the same slit pattern (see FIGS. 30 and 31) overlap to provide areas that can be bonded together to increase the rigidity of the reticulated structure. In the illustrative embodiment each aperture 84 has three flaps 86 which present two areas of overlap, indicated at 88 and 90. There is thus formed a structural panel having one or two spaced generally parallel perforate skins interconnected by a reticulated core. The core is formed by the material in the sheet that is folded normal to the plane of the sheet. This material is also normal to the overlapping flaps which define a perforate skin. It should be appreciated that for every flap portion there must be a corresponding area that is removed from the sidewall portions of the apertures (shown by arrow 92 in FIG. 30). The areas of overlap can be modified as desired by varying one or more of the many dimensions involved such as the width $w$ of the bridge portions, the length $a$ of the straight sides, the length $b$ of the angled sides, and the angle $e$ that would be formed if the angled sides were extended so that they would intersect. However, it should be appreciated that a skin or skins could be attached to the above-identified reticulated structure if desired.

When it is desired to form an integral structural panel from a single sheet, reticulated structures other than that illustrated in FIGS. 29 through 31 could be used. For example, the reticulated structure of FIGS. 20 through 25 could be employed, with the overlapping portions indicated by the arrow 69 (FIG. 22) being affixed together by any of the above described means to form the structural panel. The areas of overlap 69 between adjacent sides of an aperture will, of course, become greater as the angle $e$ is increased. When a skin is applied to any of the embodiments in which there are overlapping portions, it may be desirable to remove part or all of these portions so that the skin will be flush with the surface of the reticulated structure. The overlapping portions can be removed by any method such as, for example, by punching during or after the repetitive slit pattern is being formed.

To vary the resistance of the structure in various directions to bending stresses, the angle $e$ (shown in FIG. 3) can be modified as desired. Increasing the bending resistance transversely of the structure is accomplished by increasing the angle $e$ to 180°. The resulting alternative embodiment characterized by its rectangular shaped apertures is depicted in FIG. 34. The method of fabricating the structure which has been described herein may be utilized to form this embodiment. It should be noted, however, that, in the forming step, the elevations illustrated in FIG. 2 must be shaped as one half of a downwardly facing rectangle and the depressions similarly shaped but facing upwardly.

Thus, for all embodiments with the flaps depending upon the particular end use requirements, the type of flaps, the area of overlap (if any), the depth of the structure, and the thickness and properties of the sheet material may be varied to provide the required properties of the reticulated structure. In similar fashion, the various dimensions of the structure such as the lengths $a$ and $b$ of the straight and angled sides, respectively, the width $w$ of the bridge portions and the angle $e$ may be modified to fabricate a structure with the desired properties.

The invention, as has been seen, provides a method of easily fabricating a reticulated structure from a sheet material. The resulting reticulated structure has a maximum resistance with respect to bending stresses that develop when load exerts force on the structure and yet provides significant surface area in the planes defined by the top and bottom surfaces of the structure to facilitate the bonding of the skin to the structure. Moreover, the strength characteristics of the resulting reticulated structure are improved. In accordance with one embodiment of the invention the reticulated structure is provided with overlapping flap portions which can be bonded together to form a rigid structural member without the necessity of applying skins to its surfaces.

I claim as my invention:

1. A stable integral reticulated structure formed from sheet material, said structure having a substantially uniform depth and being defined by a plurality of bridge portions having a width $w$ and side portions including top and bottom surfaces, said bridge and side portions forming rows of polygonal-shaped apertures with the apertures in any given row being staggered with respect to those in adjacent rows, said apertures being wider in at least one direction than said bridge portion widths $w$, said bridge portions having planes parallel to the surfaces defined by respective ones of the top and bottom surfaces of the side portions, said bridge portions being disposed in longitudinal rows alternately interconnecting adjacent ones of the bottom and top surfaces of the side portions, and said bridge portions being disposed substantially in the planes of the top and bottom surfaces of the structure.

2. The reticulated structure of claim 1 wherein the sides of at least some of the apertures are provided with integral flap portions that are generally disposed in the planes of the top and bottom surfaces of the reticulated structure.

3. The reticulated structure of claim 1 wherein the apertures are octagonal in shape.

4. The reticulated structure of claim 1 wherein the apertures are rectangular in shape.

5. The reticulated structure of claim 2 wherein each side of at least some of the apertures have a flap portion attached thereto.

6. The reticulated structure of claim 5 wherein three sides of at least some of the apertures have flap portions overlying the apertures, the flap portions being located for a particular aperture in a plane defined by only one of the top and bottom surfaces of the structure.

7. The reticulated structure of claim 2 wherein each side of at least some of the apertures have two flaps attached thereto.

8. The reticulated structure of claim 7 wherein the flaps have a length substantially identical to the length of the side portion to which they are attached.

9. The reticulated structure of claim 2 wherein each side of at least some of the apertures have flap portions overlying the apertures, the flap portions being located for a particular aperture in a plane defined by only one of the top and bottom surfaces of the structure.

10. A stable integral reticulated structure formed from sheet material, said structure having a substantially uniform depth and being defined by a plurality of bridge portions having a width $w$ and side portions including top and bottom surfaces, said bridge and side portions forming rows of polygonal-shaped apertures with the apertures in any given row being staggered with respect to those in adjacent rows, said apertures being wider in at least one direction than said bridge portion widths $w$, said bridge portions having planes parallel to the surfaces defined by respective ones of the top and bottom surfaces of the side portions, said bridge portions being disposed in longitudinal rows alternately interconnecting adjacent ones of the bottom and top surfaces of the side portions, said side portions being substantially perpendicular to the top and bottom of the surface planes of the structure defined by the top and bottom surfaces of the side portion, the sides of at least some of the apertures being provided with integral flap portions that are generally disposed in the planes of the top and bottom surfaces of the reticulated structure and at least some of the flap portions in a given aperture overlap one another.

11. The reticulated structure of claim 2 having flap portions with overlapping portions and said overlapping portions being bonded together to define a perforate skin.

12. The reticulated structure of claim 1 wherein at least one surface of the structure has a substantially planar skin attached to at least some of the bridge portions.

13. The reticulated structure of claim 2 wherein at least one surface of the structure has a substantially planar skin attached to at least some of the bridge portions and flap portions.

14. The reticulated structure of claim 5 wherein at least some of the flap portions attached to the side portions of the apertures are oppositely disposed with respect to the bridge portions.

15. The reticulated structure of claim 2 wherein the flap portions overlying at least some of the apertures are disposed in the planes defined by both the top and bottom surfaces of the structure.

16. A method of forming an integral reticulated structure from sheet material, said structure having a substantially uniform depth and being defined by a plurality of bridge portions having a width $w$ and side portions forming staggered rows of polygonal-shaped apertures wider in at least one direction than said bridge portion widths w, the bridge portions being disposed in longitudinal rows alternately interconnecting adjacent ones of the bottom and top surfaces of the side portions, and the bridge portions being disposed substantially in the planes of the top and bottom surfaces of the structure, which comprises the steps of precutting the sheet material to provide offset longitudinal rows of spaced, interrupted slits in accordance with a repetitive pattern including longitudinal slits and transverse slits intersecting the longitudinal slits, forming a longitudinal series of alternating elevations and depressions having flat crests and bottoms and which extend across the lateral dimension of the sheet material, the elevations and depressions being formed so that at least part of the unslit portions bridging the successive patterns alternately coincide with the crests and bottoms, and folding the part of the unslit portions coinciding with the crests and bottoms along lines collinear with the ends of the transverse slits and parallel to the longitudinal slits through an angle of between zero and 180° to produce said structure.

17. The method of claim 16 wherein the angle is approximately 90° whereby the portions between the fold lines and the laterally adjacent longitudinal slits are brought to a position substantially perpendicular to the original plane of the sheet material.

18. The method of claim 17 wherein the repetitive pattern includes a pair of spaced parallel longitudinal slits with the transverse slits intersecting the longitudinal slits at their ends to define a perforation, the material within each perforation being removed.

19. The method of claim 17 wherein the repetitive pattern comprises a pair of terminal transverse slits, a pair of intermediate transverse slits, terminal longitudinal slits onnecting one end of the terminal transverse slits to the intermediate transverse slit and an intermediate longitudinal slit connecting the opposite end of the intermediate transverse slits, and wherein the portions extending above and below the common depth of the structure are folded to bring them into planes generally corresponding to the top and bottom surfaces of the structure, respectively.

20. The method of claim 17 wherein the repetitive pattern includes a pair of intermediate transverse slits intersecting the longitudinal slit, and wherein the portions extending above and below the common depth of the structure are folded to bring them into planes generally corresponding to the top and bottom surfaces of the structure, respectively.

21. The method of claim 17 wherein the portions extending above and below the common depth of the structure are folded to bring at least some of them into an overlapping relationship and all of them into planes generally corresponding to the top and bottom surfaces of the structure, respectively.

22. The method of claim 16 wherein the angle is greater than 90° and less than 180°.

23. The method of claim 16 wherein at least some of the repetitive patterns include additional transverse slits parallel to, and disposed between, the other transverse slits, each of the transverse slits terminating at an intersection with a longitudinal slit.

24. The method of forming an integral reticulated structural panel from sheet material, said structure having a substantially uniform depth and being defined by a plurality of bridge portions having a width w and side portions forming staggered rows of polygonal-shaped apertures wider in at least one direction than said bridge portion widths w, the bridge portions being disposed in longitudinal rows alternately interconnecting adjacent ones of the bottom and top surfaces of the side portions, and the bridge portions being disposed substantially in the planes of the top and bottom surfaces of the structure, which comprises the steps of precutting the sheet material to form offset longitudinal rows of spaced interrupted slits in accordance with a predetermined pattern including longitudinal slits and transverse slits intersecting the longitudinal slits, forming a longitudinal series of alternating elevations and depressions having flat crests and bottoms which extend across the lateral dimension of the sheet material with at least a part of the unslit portions bridging successive patterns alternately coinciding with the crests and bottoms, folding the part of the unslit portions coinciding with the crests and bottoms along lines collinear with the end of the transverse slits and parallel to the longitudinal slits through an angle of between zero and 180° to form a reticulated core having flap portions extending beyond at least one of the top and bottom planes of the core, bending the flap portions into the plane of at least one of the top and bottom planes of the core and into overlapping relation to one another, and affixing the overlapping portions to one another to form at least one perforate skin integral with the core and formed from a common sheet of material.

25. The method of claim 24 wherein the unslit portions are folded through 90°.

26. A method of forming an integral reticulated structural panel from sheet material, said structure having a substantially uniform depth and being defined by a plurality of bridge portions having a width w and side portions forming staggered rows of polygonal-shaped apertures wider in at least one direction than said bridge portion widths w, the bridge portions being disposed in longitudinal rows alternately interconnecting adjacent ones of the bottom and top surfaces of the side portions, and the bridge portions being disposed substantially in the planes of the top and bottom surfaces of the structure, which comprises the steps of precutting the sheet material to form offset longitudinal rows of spaced, interrupted slits defining a repetitive pattern including longitudinal slits and transverse slits intersecting the longitudinal slits, forming a longitudinal series of alternating elevations and depressions having flat crests and bottoms and which extend across the lateral dimension of the sheet material, the elevations and depressions being formed so that at least part of the unslit portions bridging successive patterns alternately coincide with the crests and bottoms, folding the part of the unslit portions coinciding with the crests and bottoms along lines collinear with the ends of the transverse slits and parallel to the longitudinal slits through an angle of between zero and 180° to produce said structure and attaching a skin to at least one of the surfaces of the structure.

27. The method of claim 26 wherein the angle is substantially 90°, whereby the portions between the fold lines and the laterally adjacent longitudinal slits are brought to a position substantially perpendicular to the original plane of the sheet material.

28. The method of claim 26 wherein the repetitive pattern comprises a pair of spaced, parallel longitudinal slits having transverse slits intersecting the longitudinal slits at their ends to form a perforation with the material within the perforation being removed.

29. The method of claim 28 wherein the repetitive pattern comprises a longitudinal slit, a pair of terminal transverse slits intersecting the longitudinal slit at its ends and a pair of intermediate transverse slits intersecting the longitudinal slit, and wherein the portions extending above and below the common depth of the structure are folded to bring them into planes generally corresponding to the top and bottom surfaces of the structure, respectively.

30. The method of claim 26 wherein the repetitive pattern comprises a pair of terminal transverse slits, a pair of intermediate transverse slits, terminal longitudinal slits connecting one end of the terminal transverse slits to the intermediate transverse slits and an intermediate longitudinal slit connecting the opposite end of the intermediate transverse slits, and the portions extending above and below the common depth of the structure are folded to bring them into planes generally corresponding to the top and bottom surfaces of the structure, respectively.

31. The method of claim 26 wherein the angle is less than 90° and wherein a skin is attached to the structure by applying pressure thereto sufficient to bring the portions between the fold lines and laterally adjacent longitudinal slits to a position substantially perpendicular to the original plane of the sheet material.

32. The method of claim 26 wherein the angle is greater than 90° and wherein a skin is attached to the structure by applying pressure thereto sufficient to bring the portions between the fold lines and laterally adjacent longitudinal slits to a position substantially perpendicular to the original plane of the sheet material.

33. The method of claim 26 which includes removing any overlapping portions of the sheet material which would prevent the skin from being positioned substantially flush to at least one of the top and bottom surfaces of the structure.

References Cited

UNITED STATES PATENTS

| | | | |
|---|---|---|---|
| 855,240 | 5/1907 | Forsyth | 52—671 |
| 1,019,034 | 3/1912 | Forsyth | 52—672 |
| 1,983,412 | 12/1934 | Smith | 52—670 |
| 2,191,788 | 2/1940 | Collins | 52—635 |
| 3,112,533 | 12/1963 | Hauer | 52—674 |
| 3,376,684 | 4/1968 | Cole et al. | 52—635 |

ALLEN B. CURTIS, Primary Examiner

U.S. Cl. X.R.

29—6.1; 52—635, 671